(12) United States Patent
Naphad et al.

(10) Patent No.: US 8,591,631 B2
(45) Date of Patent: Nov. 26, 2013

(54) METHOD AND APPARATUS TO PRODUCE SYNTHETIC GAS

(75) Inventors: Sachin Naphad, Houston, TX (US); Pradeep Thacker, Houston, TX (US)

(73) Assignee: General Electric Company, Schenectady, NY (US)

(*) Notice: Subject to any disclaimer, the term of this patent is extended or adjusted under 35 U.S.C. 154(b) by 900 days.

(21) Appl. No.: 11/831,639

(22) Filed: Jul. 31, 2007

(65) Prior Publication Data
US 2009/0031630 A1 Feb. 5, 2009

(51) Int. Cl.
*B01D 47/00* (2006.01)

(52) U.S. Cl.
USPC .......... 95/160; 95/235; 95/236; 95/191; 95/192; 95/234

(58) Field of Classification Search
USPC ............ 95/139, 149–266; 518/700–718; 423/210–248; 48/61, 128; 96/155–220; 29/428
See application file for complete search history.

(56) References Cited

U.S. PATENT DOCUMENTS

| | | | |
|---|---|---|---|
| 4,138,230 A | 2/1979 | Thompson | |
| 4,189,307 A * | 2/1980 | Marion | 48/197 R |
| 4,275,044 A | 6/1981 | Kamody | |
| 4,359,450 A | 11/1982 | Blytas et al. | |
| 4,568,364 A * | 2/1986 | Galstaun et al. | 95/176 |
| 4,682,985 A | 7/1987 | Kohl | |
| 4,741,884 A * | 5/1988 | Carter et al. | 422/171 |
| 5,137,550 A | 8/1992 | Hegarty et al. | |
| 5,240,476 A | 8/1993 | Hegarty | |
| 5,669,960 A * | 9/1997 | Couche | 95/96 |
| 5,780,663 A * | 7/1998 | Mori et al. | 558/275 |
| 6,033,456 A | 3/2000 | Jahnke | |
| 6,036,748 A * | 3/2000 | Wallace et al. | 95/257 |
| 6,102,987 A * | 8/2000 | Gross et al. | 95/172 |
| 6,114,400 A * | 9/2000 | Nataraj et al. | 518/715 |
| 6,149,859 A | 11/2000 | Jahnke et al. | |
| 6,203,599 B1 * | 3/2001 | Schubert et al. | 95/172 |
| 6,334,886 B1 * | 1/2002 | Barnes et al. | 95/181 |
| 6,342,091 B1 * | 1/2002 | Menzel et al. | 95/167 |
| 6,667,347 B2 * | 12/2003 | O'Rear et al. | 518/700 |
| 6,720,359 B2 * | 4/2004 | O'Rear et al. | 518/702 |
| 6,797,079 B2 * | 9/2004 | Nagano et al. | 148/432 |
| 6,964,696 B2 * | 11/2005 | Malatak et al. | 95/163 |

(Continued)

FOREIGN PATENT DOCUMENTS

| | | |
|---|---|---|
| EP | 0227259 A1 | 7/1987 |
| EP | 1207132 A1 | 5/2002 |

OTHER PUBLICATIONS

Unofficial English translation of CN Office Action dated Aug. 13, 2012 from corresponding CN Application No. 200880110394.9.

*Primary Examiner* — Duane Smith
*Assistant Examiner* — Thomas McKenzie
(74) *Attorney, Agent, or Firm* — Armstrong Teasdale LLP

(57) ABSTRACT

A method of assembling an acid gas component reduction system includes coupling at least one acid removal system in flow communication with at least one first synthetic gas (syngas) stream with at least one acid gas component having a first acid gas component concentration. The method also includes coupling at least one integral absorber in flow communication with the at least one acid removal system. The method further includes configuring the at least one integral absorber such that substantially continuous service of the at least one integral absorber facilitates producing a second syngas stream having a second acid gas component concentration that is less than the first acid gas component concentration.

12 Claims, 3 Drawing Sheets

(56) References Cited

U.S. PATENT DOCUMENTS

| | | |
|---|---|---|
| 7,503,947 B2 | 3/2009 | Barnicki |
| 7,517,390 B2 * | 4/2009 | Lang ............................. 95/139 |
| 7,708,801 B2 * | 5/2010 | Thacker et al. ..................... 95/1 |
| 2004/0107835 A1 * | 6/2004 | Malatak et al. ................. 95/196 |
| 2004/0118126 A1 | 6/2004 | Ong et al. |
| 2005/0191237 A1 * | 9/2005 | Selinger et al. ............ 423/658.2 |
| 2006/0150812 A1 * | 7/2006 | Mak et al. ...................... 95/199 |
| 2007/0129450 A1 | 6/2007 | Barnicki et al. |

* cited by examiner

METHOD AND APPARATUS TO PRODUCE SYNTHETIC GAS

BACKGROUND OF THE INVENTION

The present invention relates generally to gasification plants, and more particularly, to methods and apparatus for optimizing synthetic gas production with a gasification system via acid gas removal.

At least some known gasification plants include a gasification system that is integrated with at least one power-producing turbine system, thereby forming an integrated gasification combined cycle (IGCC) power generation plant. For example, known gasification systems convert a mixture of fuel, air or oxygen, steam, and/or $CO_2$ into a synthetic gas, or "syngas". The syngas is channeled to the combustor of a gas turbine engine, which powers a generator that supplies electrical power to a power grid. Exhaust from at least some known gas turbine engines is supplied to a heat recovery steam generator (HRSG) that generates steam for driving a steam turbine. Power generated by the steam turbine also drives an electrical generator that provides electrical power to the power grid.

At least some known gasification systems associated with IGCC plants initially produce a "raw" syngas fuel which includes carbon monoxide (CO), hydrogen ($H_2$), carbon dioxide ($CO_2$), carbonyl sulfide (COS), and hydrogen sulfide ($H_2S$). $CO_2$, COS, and $H_2S$ are typically referred to as acid gases. Acid gas is generally removed from the raw syngas fuel to produce a "clean" syngas fuel for combustion within the gas turbine engines. Such acid gas removal is performed with an acid gas removal subsystem that typically includes at least one main absorber to remove a majority of $H_2S$ and COS. Such acid gas removal subsystems also typically include at least one ancillary absorber that "scrubs" predetermined components from associated fluid streams to predetermined values. Many known absorbers are positioned between acid gas removal subsystem conduits and conduits that permit scrubbed gas streams to be released to the environment. These ancillary absorbers are normally in service only during predetermined operational activities, for example, plant startups and component failure-related transients. The typical number of absorbers used increases the number and length of associated piping runs and the number of absorber vessels that are provided, installed and operated, thereby increasing the overall cost of ownership of the IGCC plant with little additional cost-effective duty realized. Moreover, most known ancillary absorbers do not facilitate decreasing the concentration of $H_2S$ and COS within the associated gas streams.

BRIEF DESCRIPTION OF THE INVENTION

In one aspect, a method of assembling an acid gas component reduction system is provided. The method includes coupling at least one acid removal system in flow communication with at least one first synthetic gas (syngas) stream with at least one acid gas component having a first acid gas component concentration. The method also includes coupling at least one integral absorber in flow communication with the at least one acid removal system. The method further includes configuring the at least one integral absorber such that substantially continuous service of the at least one integral absorber facilitates producing a second syngas stream having a second acid gas component concentration that is less than the first acid gas component concentration.

In another aspect, a sulfur reduction system is provided. The system includes at least one integral absorber. The at least one integral absorber is configured for substantially continuous service. The system also includes at least one conduit coupled in flow communication with the at least one integral absorber and at least one acid removal system. The at least one integral absorber, the at least one acid removal system, and the at least one conduit are configured to facilitate a decrease in a sulfur concentration within at least one fluid stream.

In a further aspect, an integrated gasification combined-cycle (IGCC) power generation plant is provided. The plant includes at least one gasification system configured to generate a raw gas stream comprising acid gas. The plant also includes at least one acid gas removal subsystem configured to remove at least a portion of acid gas from the raw gas stream. The plant further includes at least one sulfur reduction subsystem coupled in flow communication with the at least one acid gas removal subsystem. The sulfur reduction subsystem includes at least one integral absorber. The at least one integral absorber is configured for substantially continuous service. The sulfur reduction subsystem also includes at least one conduit coupled in flow communication with the at least one integral absorber and the at least one acid gas removal system. The at least one integral absorber, the at least one acid gas removal subsystem, and the at least one conduit are configured to facilitate a decrease in sulfur concentration within at least one fluid stream.

DETAILED DESCRIPTION OF THE INVENTION

Figure 1:
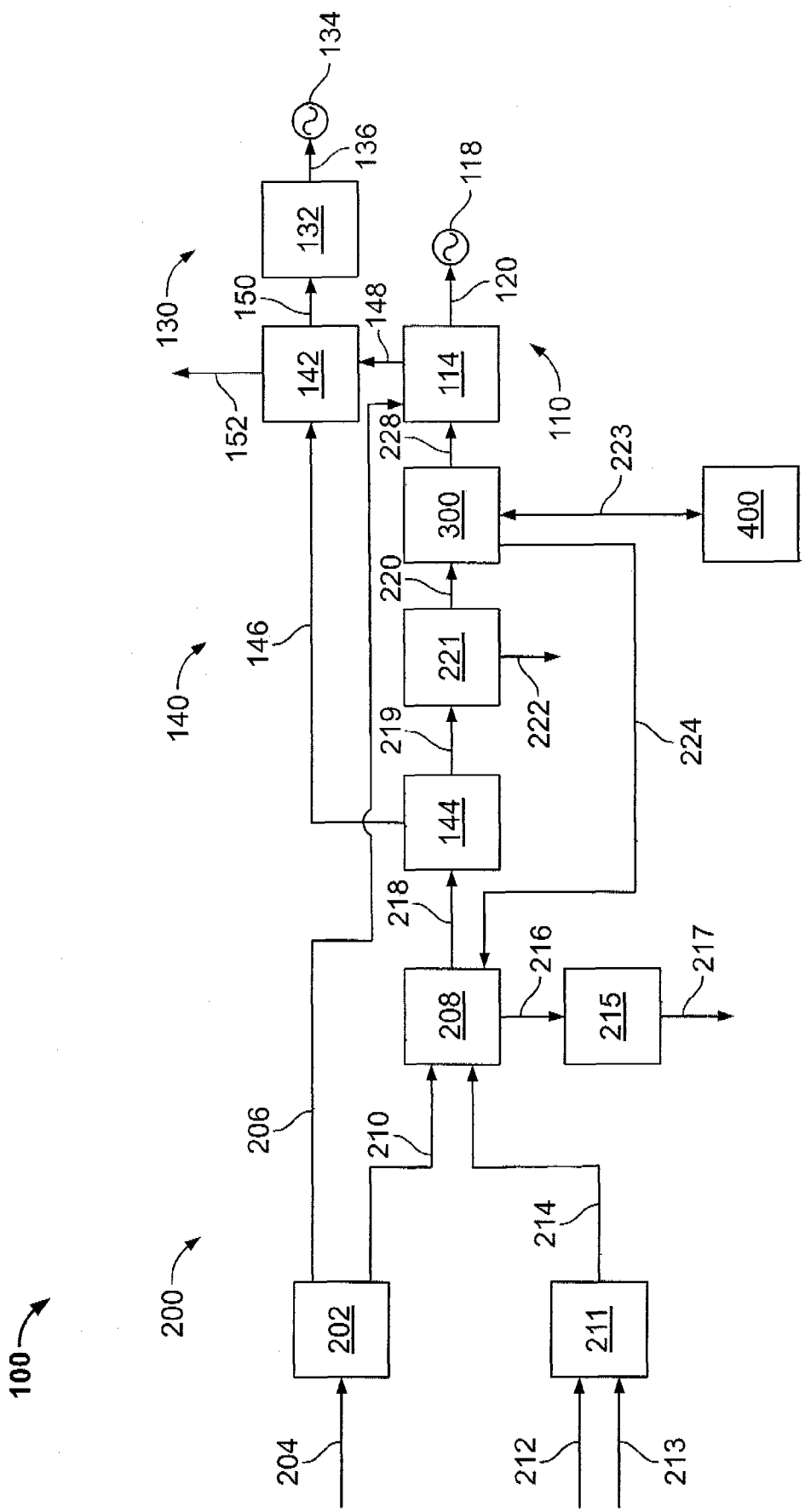
FIG. 1 is a schematic diagram of an exemplary integrated gasification combined-cycle (IGCC) power generation plant.

FIG. 1 is a schematic diagram of an exemplary integrated gasification combined-cycle (IGCC) power generation plant 100. In the exemplary embodiment, IGCC plant includes a gas turbine engine 110. Turbine 114 is rotatably coupled to a first electrical generator 118 via a first rotor 120. Turbine 114 is coupled in flow communication with at least one fuel source and at least one air source (both described in more detail below) and is configured to receive the fuel and air from the fuel source and the air source, respectively. Turbine 114 is configured to mix air and fuel, produce hot combustion gases (not shown), and convert the heat energy within the gases to rotational energy. The rotational energy is transmitted to generator 118 via rotor 120, wherein generator 118 is configured to facilitate converting the rotational energy to electrical energy (not shown) for transmission to at least one load, including, but not limited to, an electrical power grid (not shown).

IGCC plant 100 also includes a steam turbine engine 130. In the exemplary embodiment, engine 130 includes a steam turbine 132 rotatably coupled to a second electrical generator 134 via a second rotor 136.

IGCC plant 100 further includes a steam generation system 140. In the exemplary embodiment, system 140 includes at least one heat recovery steam generator (HRSG) 142 that is coupled in flow communication with at least one heat transfer apparatus 144 via at least one heated boiler feedwater conduit 146. HRSG 142 is configured to receive boiler feedwater (not shown) from apparatus 144 via conduit 146 for facilitating heating the boiler feedwater into steam. HRSG 142 is also configured to receive exhaust gases (not shown) from turbine 114 via an exhaust gas conduit (not shown) to further facilitate heating the boiler feedwater into steam. HRSG 142 is coupled in flow communication with turbine 132 via a steam conduit 150. Excess gasses and steam are exhausted from HRSG 142 to the atmosphere via stack gas conduit 152.

Conduit 150 is configured to channel steam (not shown) from HRSG 142 to turbine 132. Turbine 132 is configured to receive the steam from HRSG 142 and convert the thermal energy in the steam to rotational energy. The rotational energy is transmitted to generator 134 via rotor 136, wherein generator 134 is configured to facilitate converting the rotational energy to electrical energy (not shown) for transmission to at least one load, including, but not limited to, the electrical power grid. The steam is condensed and returned as boiler feedwater via a condensate conduit (not shown).

IGCC plant 100 also includes a gasification system 200. In the exemplary embodiment, system 200 includes at least one air separation unit 202 coupled in flow communication with an air source via an air conduit 204. The air sources include, but are not limited to, dedicated air compressors and compressed air storage units (neither shown). Unit 202 is configured to separate air into oxygen ($O_2$), nitrogen ($N_2$) and other components (neither shown). The other components are released via a vent (not shown). $N_2$ is channeled to gas turbine 114 via a $N_2$ conduit to facilitate combustion.

System 200 includes a gasification reactor 208 that is coupled in flow communication with unit 202 and is configured to receive the $O_2$ channeled from unit 202 via an $O_2$ conduit 210. System 200 also includes a coal grinding and slurrying unit 211. Unit 211 is coupled in flow communication with a coal source and a water source (neither shown) via a coal supply conduit 212 and a water supply conduit 213, respectively. Unit 211 is configured to mix the coal and water to form a coal slurry stream (not shown) that is channeled to reactor 208 via a coal slurry conduit 214.

Reactor 208 is configured to receive the coal slurry stream and an $O_2$ stream via conduits 214 and 210, respectively. Reactor 208 is also configured to facilitate production of a hot, raw synthetic gas (syngas) stream (not shown). The raw syngas includes carbon monoxide (CO), hydrogen ($H_2$), carbon dioxide ($CO_2$), carbonyl sulfide (COS), and hydrogen sulfide ($H_2S$). While $CO_2$, COS, and $H_2S$ are typically collectively referred to as acid gases, or acid gas components of the raw syngas, hereon, $CO_2$ will be discussed separately from the remaining acid gas components. Moreover, reactor 208 is also configured to produce a hot slag stream (not shown) as a by-product of the syngas production. The slag stream is channeled to a slag handling unit 215 via a hot slag conduit 216. Unit 215 is configured to quench and break up the slag into small slag pieces wherein a slag removal stream is produced and channeled through conduit 217.

Reactor 208 is coupled in flow communication with heat transfer apparatus 144 via a hot syngas conduit 218. Apparatus 144 is configured to receive the hot, raw syngas stream and transfer at least a portion of the heat to HRSG 142 via conduit 146. Subsequently, apparatus 144 produces a cooled raw syngas stream (not shown) that is channeled to a scrubber and low temperature gas cooling (LTGC) unit 221 via a syngas conduit 219. Unit 221 is configured to remove particulate matter entrained within the raw syngas stream and facilitate removal of the removed matter via a fly ash conduit 222. Unit 221 is also configured to further cool the raw syngas stream.

Moreover, unit 221 is configured to convert at least a portion of COS in the raw syngas stream to $H_2S$ and $CO_2$ via hydrolysis.

System 200 further includes an acid gas removal subsystem 300 that is coupled in flow communication with unit 221 and is configured to receive the cooled raw syngas stream via a raw syngas conduit 220. Subsystem 300 is also configured to facilitate removal of at least a portion of acid components (not shown) from the raw syngas stream as discussed further below. Such acid gas components include, but are not limited to, $CO_2$, COS, and $H_2S$. Subsystem 300 is further configured to facilitate separation of at least some of the acid gas components into components that include, but are not limited to, $CO_2$, COS, and $H_2S$. Moreover, subsystem 300 is coupled in flow communication with a sulfur reduction subsystem 400 via a conduit 223. Subsystem 400 is also configured to receive and facilitate separation of at least some of the acid gas components into components that include, but are not limited to, $CO_2$, COS, and $H_2S$. Furthermore, subsystem 400 is configured to channel a final integrated gas stream (not shown) to reactor 208 via subsystem 300 and a final integrated gas stream conduit 224. The final integrated gas stream includes predetermined concentrations of $CO_2$, COS, and $H_2S$ that result from previous integrated gas streams (not shown) as discussed further below.

Subsystem 300 is coupled in flow communication with reactor 208 via conduit 224 wherein the final integrated gas stream is channeled to predetermined portions of reactor 208. The separation and removal of such $CO_2$, COS, and $H_2S$ via subsystems 300 and 400 facilitates producing a clean syngas stream (not shown) that is channeled to gas turbine 114 via a clean syngas conduit 228.

In operation, air separation unit 202 receives air via conduit 204. The air is separated into $O_2$, $N_2$ and other components. The other components are vented via a vent, the $N_2$ is channeled to turbine 114 via conduit 206 and the $O_2$ is channeled to gasification reactor 208 via conduit 210. Also, in operation, coal grinding and slurrying unit 211 receives coal and water via conduits 212 and 213, respectively, forms a coal slurry stream and channels the coal slurry stream to reactor 208 via conduit 214.

Reactor 208 receives the $O_2$ via conduit 210, coal via conduit 214, and the final integrated gas stream from subsystem 300 via conduit 224. Reactor 208 facilitates production of a hot raw syngas stream that is channeled to apparatus 144 via conduit 218. The slag by-product that is formed in reactor 208 is removed via slag handling unit 215 and conduits 216 and 217. Apparatus 144 facilitates cooling the hat raw syngas stream to produce a cooled raw syngas stream that is channeled to scrubber and LTGC unit 221 via conduit 219 wherein particulate matter is removed from the syngas via conduit 222, the syngas is cooled further, and at least a portion of COS is converted to $H_2S$ and $CO_2$ via hydrolysis. The cool raw syngas stream is channeled to acid gas removal subsystem 300 wherein acid gas components are substantially removed such that a clean syngas stream is formed and channeled to gas turbine 114 via conduit 228.

Moreover, in operation, at least a portion of the acid components removed from the syngas stream is channeled to subsystem 400 via conduit 223 wherein acid components are removed and separated such that the final integrated gas stream is channeled to reactor 208 via subsystem 300 and conduit 224.

Further, in operation, turbine 114 receives $N_2$ and clean syngas via conduits 206 and 228, respectively. Turbine 114 combusts the syngas fuel, produces hot combustion gases and channels the hot combustion gases to induce rotation of turbine 114 which subsequently rotates first generator 118 via rotor 120.

At least a portion of the heat removed from the hot syngas via heat transfer apparatus 144 is channeled to HRSG 142 via conduit 146 wherein the heat boils water to form steam. The steam is channeled to steam turbine 132 via conduit 150 and induces a rotation of turbine 132. Turbine 132 rotates second generator 134 via second rotor 136.

Figure 2:
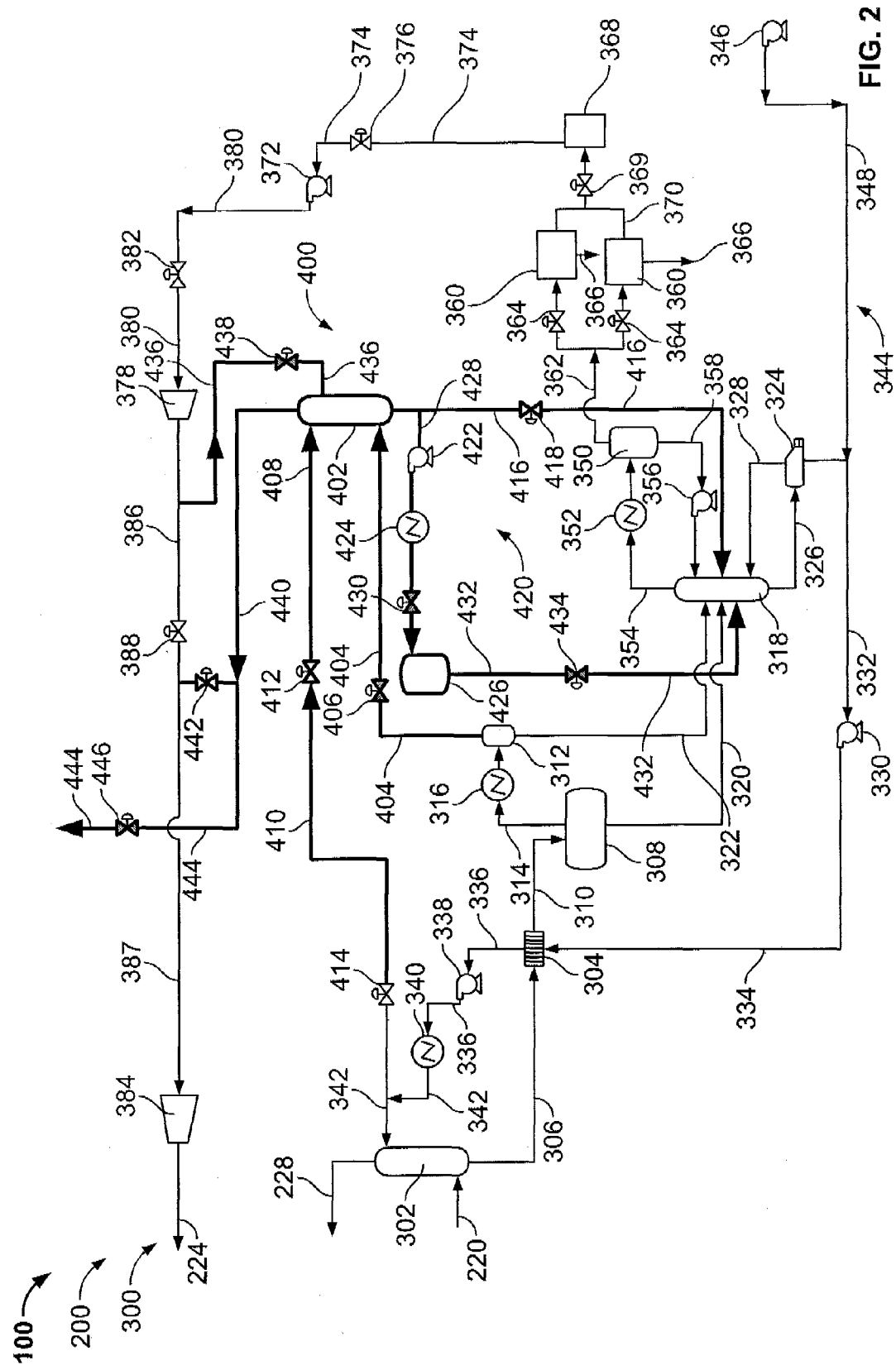
FIG. 2 is a schematic diagram of an exemplary acid gas removal subsystem and sulfur removal subsystem that can be used with the IGCC power generation plant shown in FIG. 1.

FIG. 2 is a schematic diagram of exemplary acid gas removal subsystem 300 and sulfur removal subsystem 400 that can be used with IGCC power generation plant 100 (shown in FIG. 1). Subsystem 300 receives the raw stream (not shown) via conduit 220. Also, subsystem 300 channels the clean syngas stream (not shown) via conduit 228. Moreover, subsystem 300 channels the integrated gas stream (not shown) via conduit 224 to gasification reactor 208 (shown in FIG. 1). Conduit 220 is coupled in flow communication to at least one main absorber 302. In the exemplary embodiment, subsystem 300 includes one main absorber 302 coupled in flow communication with conduit 220. Alternatively, subsystem 300 includes any number of main absorbers 302 that facilitates operation of subsystem 300 as described herein.

In the exemplary embodiment, main absorber 302 uses a solvent (not shown) that includes, but is not limited to, dimethyl ethers of polyethylene glycol (DEPG) to facilitate acid gas removal from the raw shifted syngas stream. Alternatively, main absorber 302 uses an amine-based and/or methanol-based solvent, or any solvent that facilitates acid gas removal as described herein. The raw syngas stream contacts at least a portion of an acid gas-lean solvent (not shown) which removes at least a portion of the selected acid gas components from the raw syngas stream to produce the clean syngas stream. The removed acid gas components are retained within the solvent thereby forming a first acid-gas rich, or simply rich, solvent stream (not shown). In the exemplary embodiment, such acid gas components include, but are not limited to, $CO_2$, COS, and $H_2S$. Alternatively, any components are removed that facilitates operation of IGCC plant 100 as described herein.

In the exemplary embodiment, main absorber 302 is coupled in flow communication with one flash drum 308 via heat transfer apparatus 304 and first rich solvent stream conduits 306 and 310. Alternatively, main absorber 302 is coupled in flow communication with any number of flash drums 308 that facilitate operation of subsystem 300 as described herein. Apparatus 304 is configured to remove heat from at least a portion of the acid-gas rich solvent stream and conduit 306 is configured to channel the first acid-gas rich solvent stream from absorber 302 to apparatus 304. Heat transfer apparatus 304 is coupled in flow communication with flash drum 308 (sometimes referred to as a flash tank) via conduit 310.

Flash drum 308 is configured to facilitate phase separation via flashing at least a portion of the $CO_2$, COS, and $H_2S$ gaseous components within the first rich solvent stream to form a flash gas stream (not shown). The flash gas stream includes predetermined concentrations of gaseous $CO_2$, COS, and $H_2S$ components. Specifically, the flash gas stream includes a first concentration of gaseous $CO_2$, a first concentration of gaseous COS, and a first concentration of gaseous $H_2S$. Flash drum 308 is coupled in flow communication with a first phase separator 312 via conduits 314 and a heat transfer apparatus 316. Conduits 314 are configured to channel the flash gas stream from flash drum 308 to separator 312. Apparatus 316 is configured to remove heat from at least a portion of the flash gas stream. A first integrated gas stream (not shown) is produced within phase separator 312 as discussed further below.

Flash drum 308 is also configured to form a second rich solvent stream (not shown) that includes at least some remaining $CO_2$, COS and $H_2S$ gaseous components not removed by the flashing mechanism as described above. Therefore, in the exemplary embodiment, the one flash drum 308 is also coupled in flow communication with at least one acid gas stripper 318 via a second rich solvent conduit 320 that is configured to channel the second rich solvent stream to acid gas stripper 318. Alternatively, a plurality of flash drums 308 are coupled in flow communication to each other in a series or parallel configuration, wherein the plurality of flash drums 308 are coupled in flow communication with acid gas stripper 318 via any number of conduits that facilitate operation of subsystem 300 as described herein.

Stripper 318 is also coupled in flow communication with first phase separator 312 via a partial solvent and water conduit 322. Separator 312 is configured to receive the flash gas stream from conduits 314 and heat transfer apparatus 316 that includes at least some rich solvent and water in addition to the first concentration of gaseous $CO_2$, the first concentration of COS and the first concentration of gaseous $H_2S$. Separator 312 is also configured to separate at least a portion of the water from the flash gas stream, thereby forming the first integrated gas stream and a partial solvent and water stream (not shown). The first integrated gas stream has a second concentration of gaseous $CO_2$. Also, the first integrated gas stream has a second concentration of gaseous COS. Moreover, the first integrated gas stream has a second concentration of gaseous $H_2S$. Conduit 322 is configured to channel the partial solvent and water stream to acid gas stripper 318.

Stripper 318 is configured to receive a plurality of rich solvent and partial solvent and water streams, including those streams channeled by conduits 320 and 322. Stripper 318 is further configured to regenerate the received rich solvent to a lean solvent by facilitating the removal of substantially all of any acid gas components within the rich solvent, thereby forming a lean solvent stream (not shown) that is substantially free of $CO_2$, COS and $H_2S$. In the exemplary embodiment, stripper 318 includes a refrigerant system (not shown) that facilitates regeneration, wherein such refrigerant system includes at least one electric motor-driven refrigerant compressor. Alternatively, stripper 318 includes any system or apparatus that facilitates operation of system 300 as described herein.

Stripper 318 is coupled in flow communication with a reboiler 324 via a conduit 326 wherein the lean solvent stream is channeled to reboiler 324. Reboiler 324 is configured to heat the lean solvent. Moreover, reboiler 324 is further coupled in flow communication with stripper 318 wherein a portion of the heated lean solvent is channeled to stripper 318 via a conduit 328, thereby facilitating a vapor boilup within stripper 318 such that stripper performance is facilitated.

Reboiler 324 is also coupled in flow communication with apparatus 304 via at least one pump 330 and conduits 332 and 334, wherein pump 330 and conduits 332 and 334 are configured to channel the hot lean solvent stream through apparatus 304. Apparatus 304 is configured to facilitate a transfer of heat from the hot lean solvent stream to the first rich solvent stream. Apparatus 304 is coupled in flow communication with main absorber 302 via a plurality of conduits 336, at least one pump 338 and a heat transfer apparatus 340. Conduits 336, pump 338 and apparatus 340 are configured to channel a warm lean solvent stream (not shown) from apparatus 304 and facilitate a removal of at least some of the heat within the warm solvent stream to form a cool lean solvent stream. A conduit 342 is configured to channel that stream from apparatus 340 to main absorber 302.

Pump 330 is also coupled in flow communication with a lean solvent makeup subsystem 344. Subsystem 344 includes a lean solvent source (not shown), at least one pump 346 coupled to the source, and, in the exemplary embodiment, a conduit 348 that is configured to channel a lean solvent stream to conduit 332 for use within subsystem 300. Alternatively, conduit 348 is coupled in flow communication with conduit 336 downstream of heat transfer apparatus 304, thereby facilitating optimization of heat transfer into the lean solvent stream channeled from reboiler 324.

Stripper 318 is also configured to produce a first $CO_2/COS/H_2S$ acid gas stream as a function of regenerating the solvent as described above. The first $CO_2/COS/H_2S$ acid gas stream includes a third $CO_2$ concentration, a third COS concentration, a third $H_2S$ concentration, and a first concentration of water, wherein the third $CO_2$, COS and $H_2S$ concentrations are not referenced to the first and second $CO_2$, COS and $H_2S$ concentrations described above, respectively. Stripper 318 is coupled in flow communication with a second phase separator 350 via at least one heat transfer apparatus 352 and a plurality of conduits 354. Apparatus 352 is configured to remove heat from the hot first $CO_2/COS/H_2S$ acid gas stream and condense and remove water from the stream. The first $CO_2/COS/H_2S$ acid gas stream may contain solvent, therefore, separator 350 facilitates removing such solvent and channeling the solvent back to stripper 318 via at least one pump 356 and conduit 358. Therefore, separator 350 forms a second $CO_2/COS/H_2S$ acid gas stream (not shown). The second $CO_2/COS/H_2S$ acid gas stream includes a fourth $CO_2$ concentration, a fourth $H_2S$ concentration, and a second concentration of water. The second water concentration in the second $CO_2/COS/H_2S$ acid gas stream is less than the first water concentration in the first $CO_2/COS/H_2S$ acid gas stream.

Subsystem 300 also includes a plurality of chemical transition units, or sulfur removal units (SRU) 360, coupled in flow communication with separator 350 via at least one conduit 362 and at least one inlet block valve 364 for each SRU 360. Each SRU 360 is configured to receive the second $CO_2/COS/H_2S$ acid gas stream and form sulfur dioxide ($SO_2$) and elemental sulfur (S). Specifically, a portion of $H_2S$ within the second $CO_2/COS/H_2S$ acid gas stream reacts with $O_2$ to form $SO_2$. $SO_2$ further reacts with a portion of the remaining $H_2S$ to form elemental S and $H_2O$. A portion of COS within the second $CO_2/COS/H_2S$ acid gas stream reacts with $H_2O$ to form $H_2S$ and $CO_2$, some of which may be further converted as described above. Unconverted $CO_2$, $SO_2$, COS, $H_2S$ and $N_2$ within SRUs 360 form and constitute a SRU tail gas stream (not shown), wherein the SRU tail gas stream has a fifth $CO_2$ concentration, a fifth COS concentration and a fifth $H_2S$ concentration. The elemental S formed is removed from each SRU 360 via a conduit 366.

SRUs 360 are coupled in flow communication with at least one chemical transition unit, or tail gas unit (TGU) 368, that is configured to receive the SRU tail gas stream via a valve 369 and conduits 370. TGU 368 is also configured to form $H_2S$ via hydrogenating the unconverted $SO_2$ with hydrogen ($H_2$). The $CO_2$ portions of the second $CO_2/COS/H_2S$ acid gas stream and the SRU tail gas stream are substantially chemically unchanged, that is, the fourth and fifth $CO_2$ concentrations, respectively, are substantially similar. Therefore, TGU 368 is configured to form a second integrated gas stream (not shown) with a sixth $CO_2$ concentration, sixth COS concentration and a sixth $H_2S$ concentration, wherein the ratio of $CO_2$-to-$H_2S$ is substantially greater than the $CO_2$-to-$H_2S$ ratio in the second $CO_2/COS/H_2S$ acid gas stream.

Acid gas removal subsystem 300 further includes at least one blower 372 coupled in flow communication with TGU 368 via conduits 374 and blocking valve 376. Moreover, subsystem 300 includes at least one low pressure (LP) compressor 378 coupled in flow communication with blower 372 via conduits 380 and blocking valve 382. Furthermore, subsystem 300 includes at least one high pressure (HP) compressor 384 coupled in flow communication with LP compressor 378 via conduits 386 and 387 and valve 388. HP compressor 384 is coupled in flow communication with conduit 224.

In the exemplary embodiment, valves 364, 369, 376, 382, and 388 are remotely- and automatically-operated valves that are coupled in data communication with a control system (not shown). Alternatively, valves 364, 369, 376, 382, and 388 are any valves operated in any manner that facilitates operation of subsystem 300 as described herein.

In operation, subsystem 300 receives raw syngas via conduit 220. The raw syngas stream is channeled to main absorber 302 wherein the raw syngas stream contacts at least a portion of the acid gas-lean solvent which removes at least a portion of the selected acid gas components from the raw syngas stream to produce the clean syngas stream. The removed acid gas components are retained within the solvent thereby forming the first acid-gas rich solvent stream. In the exemplary embodiment, such acid gas components include, but are not limited to, $CO_2$, COS, and $H_2S$.

The rich solvent is channeled from main absorber 302 via conduit 306 and lean solvent is channeled into main absorber 302 via conduit 342. The first rich solvent stream is heated in heat transfer apparatus 304 and channeled to flash drum 308 via conduit 310. The first rich solvent stream is flashed in drum 308 via a predetermined pressure drop such that a substantial portion of the entrained $CO_2$, COS, and $H_2S$ are removed from the rich solvent. Subsequently, a flash gas stream with at least a portion of the rich solvent entrained is formed. Specifically, the flash gas stream includes the first concentration of gaseous $CO_2$, the first concentration of COS and the first concentration of $H_2S$. Moreover, the second rich solvent stream with a portion of the $CO_2$, COS, and $H_2S$ is formed. The $CO_2/COS/H_2S$ acid gas concentration in the second rich solvent stream is less than the $CO_2/COS/H_2S$ acid gas concentration in the first rich solvent stream.

The second rich solvent stream is channeled to stripper 318 via conduit 320 and the flash gas stream is channeled to first phase separator 312 via conduits 314 and heat transfer apparatus 316. Apparatus 316 facilitates cooling the flash gas stream such that liquid removal by separator 312 is facilitated. The liquids, partially including solvent and water, are removed to form the partial solvent and water stream that is channeled to stripper 318 via conduit 322. The $CO_2/COS/H_2S$ acid gas concentration in the partial solvent and water stream is less than the $CO_2/COS/H_2S$ acid gas concentration in the second rich solvent stream. Moreover, the first integrated gas stream is formed by separator 312 as is discussed further below wherein the $CO_2/COS/H_2S$ acid gas-to-solvent ratio in the first integrated gas stream is greater than the $CO_2/COS/H_2S$ acid gas-to-solvent ratio in the flash gas stream.

Acid gas stripper 318 receives the second rich solvent stream and the partial solvent and water stream via conduits 320 and 322, respectively, wherein a substantial portion of $CO_2$, COS and $H_2S$ entrained within these two streams is stripped from the solvent. The rich solvent is therefore regenerated to a lean solvent and a substantial portion of the remaining entrained $CO_2$, COS and $H_2S$ stripped from the solvent to form the first $CO_2/COS/H_2S$ acid gas stream. The first $CO_2/COS/H_2S$ acid gas stream includes the third $CO_2$ concentration, the third COS concentration, the third $H_2S$ concentration, and the first concentration of water, wherein the third $CO_2$, COS and $H_2S$ concentrations are not referenced to the first and second $CO_2$, COS and $H_2S$ concentrations described above, respectively.

The regenerated, lean solvent is channeled to reboiler 324 from stripper 318 via conduit 326 wherein the lean solvent is heated. A portion of the hot lean solvent is recirculated back to stripper 318 via conduit 328 to facilitate vapor boilup within stripper 318, which subsequently facilitates a gas-from liquid stripping operation of stripper 318. The remainder of the lean solvent is channeled to heat transfer apparatus 304 as a hot lean solvent stream via pump 330 and conduits 332 and 334. Moreover, makeup lean solvent is channeled to the hot lean solvent stream via subsystem 344 and conduit 332. The hot lean solvent transfers heat to the first rich solvent stream via apparatus 304 wherein the first rich solvent stream is heated and the hot lean solvent stream is cooled to form a warm lean solvent stream. The warm lean solvent stream is channeled to heat transfer apparatus 340 via pump 338 and conduit 336 wherein the warm lean solvent stream is cooled to form a cool lean solvent stream that is channeled to main absorber 302 via conduit 342 to replace the rich solvent channeled out of absorber 302 as discussed above.

The first $CO_2/COS/H_2S$ acid gas stream is channeled to second phase separator 350 via conduits 354 and heat transfer apparatus 352. Apparatus 352 facilitates cooling the first $CO_2/COS/H_2S$ acid gas stream such that liquid removal by separator 350 is facilitated. The liquids, including entrained rich solvent, are removed to form a solvent stream that is channeled to stripper 318 via pump 356 and conduit 358. Moreover, a second $CO_2/COS/H_2S$ acid gas stream is formed by separator 350 wherein the $CO_2/H_2S$ acid gas-to-solvent ratio in the second $CO_2/OS/H_2S$ acid gas stream is greater than the $CO_2/H_2S$ acid gas-to-solvent ratio in the first $CO_2/COS/H_2S$ acid gas stream. Furthermore, the second $CO_2/COS/H_2S$ acid gas stream includes the fourth $CO_2$ concentration, the fourth $H_2S$ concentration, and the second concentration of water. The second water concentration in the second $CO_2/COS/H_2S$ acid gas stream is less than the first water concentration in the first $CO_2/COS/H_2S$ acid gas stream.

The second $CO_2/COS/H_2S$ acid gas stream, including little to no solvent, is channeled to SRUs 360 via conduit 362 and blocking valves 364, wherein valves 364 are typically open when subsystem 300 is in service. SRUs 360 facilitate forming sulfur dioxide ($SO_2$) and elemental sulfur (S). Specifically, a portion of the $H_2S$ within the second $CO_2/COS/H_2S$ acid gas stream reacts with $O_2$ to form the $SO_2$. The $SO_2$ further reacts with a portion of the remaining $H_2S$ to form the elemental S and $H_2O$. A portion of COS within the second $CO_2/COS/H_2S$ acid gas stream reacts with $H_2O$ to form $H_2S$ and $CO_2$, some of which may be further converted as described above. Unconverted $CO_2$, COS, $SO_2$, and $N_2$ within SRUs 360 form and constitute the SRU tail gas stream, wherein the SRU tail gas stream has a fifth $CO_2$ concentration, a fifth concentration of COS and a fifth $H_2S$ concentration. The elemental S formed is removed from each SRU 360 via associated conduit 366.

Valve 369 is typically open, therefore, TGU 368 receives the SRU tail gas stream via conduit 370 and forms $H_2S$ via hydrogenating the unconverted $SO_2$. The $CO_2$ portions of the second $CO_2/COS/H_2S$ acid gas stream and the SRU tail gas stream are substantially chemically unchanged, that is, the fourth and fifth $CO_2$ concentrations, respectively, are substantially similar. Therefore, TGU 368 forms the second integrated gas stream wherein the ratio of $CO_2$-to-$H_2S$ is substantially greater than the $CO_2$-to-$H_2S$ ratio in the second $CO_2/COS/H_2S$ acid gas stream.

The second integrated gas stream is channeled to blower 372 via conduits 374 and valve 376. The second integrated gas stream is then channeled to LP $CO_2$ compressor 378 via conduits 380 and valve 382. Subsequently, the second integrated gas stream is then channeled to HP $CO_2$ compressor 384 via conduits 386 and 387 and valve 388. Then, the second integrated gas stream is channeled to gasification reactor 208 via conduit 224 as at least a portion of the final integrated gas stream. Valves 376, 382, and 388 are typically open when subsystem 300 is in service.

An exemplary method of assembling an acid gas component reduction system includes coupling at least one acid removal system 300 in flow communication with at least one first synthetic gas (syngas) stream with at least one acid gas component having a first acid gas component concentration. The method also includes coupling at least one integral absorber 402 in flow communication with at least one acid removal system 300. The method further includes configuring at least one integral absorber 402 such that substantially continuous service of at least one integral absorber 402 facilitates producing a second syngas stream having a second acid gas component concentration that is less than the first acid gas component concentration.

Specifically, sulfur reduction subsystem 400 is coupled in flow communication with subsystem 300. Subsystem 400 includes at least one integral absorber 402. Absorber 402 is similar to main absorber 302 in that both absorbers 302 and 402 are configured to use a solvent to separate and remove predetermined components from a fluid stream. Absorber 402 is different from main absorber 302 in that absorber 402 operates at a lower pressure than main absorber 302 and is configured to selectively separate $CO_2$ from $H_2S$ and COS that are retained in the first integrated gas stream that is received from first phase separator 312. Absorber 402 is also configured to produce a third integrated gas stream (not shown).

Separator 312 is coupled in flow communication with absorber 402 via a plurality of conduits 404 and a blocking valve 406 wherein conduits 404 facilitate channeling the first integrated gas stream from separator 312 to absorber 402.

Subsystem 400 also includes a first lean solvent conduit 408 that is coupled in flow communication to a second lean solvent conduit 410 via a blocking valve 412. Conduit 410 is coupled in flow communication to conduit 342 via blocking valve 414. Conduits 410 and 408 facilitate channeling at least a portion of the cooled lean solvent stream from conduit 342 to absorber 402.

Absorber 402 is coupled in flow communication with stripper 318 via a plurality of conduits 416 and a blocking valve 418 wherein conduits 416 facilitate channeling a third rich solvent stream to stripper 318. Moreover, subsystem 400 further includes a rich solvent storage loop 420. Loop 420 includes at least one rich solvent transfer pump 422 coupled in flow communication to conduit 416. Pump 422 is configured to pump at least a portion of the third rich solvent stream from conduit 416 through a cooler 424 to a rich solvent storage tank 426 via at least one conduit 428 and a blocking valve 430. Loop 420 is coupled in flow communication with stripper 318, wherein a plurality of conduits 432 that include a blocking valve 434 facilitates channeling predetermined portions of rich solvent to stripper 318.

Absorber 402 is also coupled in flow communication with conduit 386 via a plurality of HP compressor bypass conduits 436 and a HP compressor bypass valve 438. Absorber 402 is further coupled in flow communication with conduit 387 via a plurality of $CO_2$ conduits 440 and a $CO_2$ valve 442. Conduit 440 is coupled in flow communication with a plurality of discharge-to-flare conduits 444 and a discharge-to-flare valve 446. Conduit 440 is configured to channel the third integrated gas stream produced by absorber 402.

In the exemplary embodiment, valves 406, 412, 414, 418, 430, 434, 438, 442, and 446 are remotely- and automatically-operated valves that are coupled in data communication with a control system (not shown). Alternatively, valves 406, 412, 414, 418, 430, 434, 438, 442, and 446 are any valves operated in any manner that facilitates operation of subsystem 400 as described herein.

In operation, portions of subsystem 400 are in substantially continuous operation and other portions are in a standby status as discussed further below. Valve 406 is typically open and the first integrated gas stream is substantially continuously channeled from first phase separator 312 to absorber 402 via conduit 404. The first integrated gas stream contacts at least a portion of the lean solvent which removes at least a portion of the selected acid gas components from the first integrated gas stream to produce the third integrated gas stream. In the exemplary embodiment, such acid gas components include, but are not limited to, $H_2S$ and COS. The third integrated gas stream includes a seventh $CO_2$ concentration, a seventh COS concentration and a seventh $H_2S$ concentration, wherein the third integrated gas stream has little to no $H_2S$ and COS entrained within. The removed $H_2S$ and COS are retained within the solvent thereby forming the third rich solvent stream.

Moreover, valve 418 is typically open and the third rich solvent stream is channeled to stripper 318 from absorber 402 via conduits 416, wherein the rich solvent is regenerated in a manner as described above. Furthermore, valves 414 and 412 are typically open such that cooled lean solvent is substantially continuously channeled from conduit 342 to absorber 402 to replenish rich solvent that is removed from absorber 402. Moreover, valve 442 is typically open such that the third integrated gas stream is substantially continuously channeled from absorber 402 to conduit 387. The third integrated gas stream mixes with one of the integrated gas streams (discussed further below) channeled through conduit 386 and 387 via compressor 378 to form at least a portion of the final integrated gas stream.

Furthermore, typically, valve 430 is closed such that substantially all of the third rich solvent stream is channeled to stripper 318. In the event that it is desired to channel a predetermined portion of the third rich solvent stream to storage tank 426, valve 430 is opened and pump 422 is operated. The portion of the stream is channeled through cooler 424 to remove at least a portion of the heat in the portion of the stream being channeled to tank 426. When the predetermined portion of the third rich solvent stream is channeled to tank 426, pump 422 is stopped and valve 430 is closed. Similarly, in the event that it is desired to channel a predetermined portion of rich solvent within tank 426 to stripper 318, valve 434 is opened and the solvent is channeled through conduits 432. Once the desired portion of solvent has been channeled, valve 434 is closed.

During operation, as described above, valves 364 and 366 are typically open. However, if a SRU 360 is to be taken out of service, for planned operational reasons or an equipment trip, the affected SRU 360 is taken out of service by closing the associated valves 364 and 366. Additional flow through the remaining in-service SRU 360 may decrease the effectiveness of the in-service SRU 360. To facilitate reducing the flow to the in-service SRU 360, valve 418 closes, thereby reducing the rich solvent flow to stripper 318 which subsequently reduces the first $CO_2/COS/H_2S$ acid gas stream flow from stripper 318 to the in-service SRU 360 via phase separator 350. Such flow modulation to SRU 360 facilitates operation of the in-service SRU 360 and TGU 368 such that a predetermined effectiveness of the in-service SRU 360 and TGU 368 is substantially attained. Moreover, such method of modulating the first $CO_2/CO/H_2S$ acid gas stream flow from stripper 318 to the in-service SRU 360 facilitates avoidance of emissions release. Furthermore, such method of continuously maintaining absorber 402 in service and modulating the flow of the associated streams facilitates avoidance of undue emissions release during transients since the reduced concentrations of $H_2S$ and COS facilitate increased operational margins to environmental compliance limits of these compounds.

Closing valve 418 and substantially eliminating rich solvent flow into stripper 318 from absorber 402 while maintaining the first integrated gas stream flow rate into absorber 402 via conduit 404 necessitates opening valve 430 and placing pump 422 in service, thereby facilitating continuous operation of absorber 402. The rich solvent producing in absorber 402 is channeled to storage tank 426 for channeling to stripper 318 during periods of lower stripper 318 duty. Valve 434 may be opened to facilitate channeling rich solvent to stripper 318 at a predetermined rate that facilitates operation of stripper 318.

In the event of removing compressor 384 from service, for planned operational reasons or an equipment trip, the stream channeled through compressor 378 may be channeled to absorber 402 via closing valve 388 and valve 442 and opening valve 438 and valve 446, thereby channeling the stream through absorber 402 to flare conduit 444 via conduits 436 and 440. Such method of continuously maintaining absorber 402 in service and channeling the associated stream facilitates avoidance of undue emissions release during transients since the reduced concentrations of $H_2S$ and COS facilitate increased operational margins to environmental compliance limits of these compounds.

Also, if IGCC plant 100 is configured with a plurality of blowers 372, compressors 378 and 384 and associated conduits 380, 386, and 387 as well as valves 376, 382 and 388, one blower 372 and/or one LP compressor 378 may be removed from service, for planned operational reasons or equipment trips, while channeling an increased portion of the associated stream through the remaining components and absorber 402. Such method of channeling the associated streams facilitates flexibility in maintaining a predetermined operational throughput. Moreover, such method of continuously maintaining absorber 402 in service and modulating the flow of the associated streams facilitates avoidance of undue emissions release during transients since the reduced concentrations of $H_2S$ and COS facilitate increased operational margins to environmental compliance limits of these compounds.

Sulfur reduction subsystem 400 facilitates mitigating a concentration of sulfur-containing species such as, but not limited to, $H_2S$ and COS in the raw and clean syngas streams channeled through conduits 220 and 228, respectively by substantially continuously mitigating the concentration of $H_2S$ and COS in the final integrated gas stream channeled to gasification reactor 208 via conduit 224. Absorber 402 is in service substantially continuously, whereby absorber 402 substantially continuously removes $H_2S$ and COS as described above. Specifically, for example, decreasing the concentration of $H_2S$ and $CO_2$ in the final integrated gas stream channeled to gasification reactor 208 via conduit 224 facilitates converting COS in the cooled raw syngas stream to $H_2S$ and $CO_2$ via hydrolysis in unit 221. Specifically, increasing the rate of conversion of COS to $H_2S$ and $CO_2$ is primarily accomplished by shifting the associated chemical reaction via decreasing the concentrations of the associated products.

Such mitigation in these $H_2S$, COS and $CO_2$ concentrations facilitates decreasing associated capital construction costs of IGCC 100. For example, decreasing the size of the aforementioned components associated with lean solvent facilitates decreasing the size of main absorber 302 and the flow rate of lean solvent to absorber 302. Moreover, the reduced flow rate of lean solvent to absorber 302 facilitates decreasing the size of heat transfer apparatus 304 and 340 as well as the size of conduits 348, 332, 334, 336, and 342 and pumps 346, 330, and 338. Furthermore, reducing standard operational costs is facilitated, including, but not limited to, auxiliary electric power usage associated with electric motor-driven regeneration refrigerant compressors and lean solvent inventories. Also, mitigating the concentration of $H_2S$ and COS being channeled through compressor 384 facilitates decreasing the size and auxiliary electric power requirements of compressor 384. Mitigating auxiliary power consumption facilitates increasing an overall efficiency of IGCC plant 100.

Furthermore, HP compressor bypass conduit 436 facilitates continued removal of $H_2S$ and COS during operational transients. Such transients include, but are not limited to, removal of predetermined equipment from service. Such removal may be for planned operational reasons or unplanned equipment trips. Therefore, maintaining $H_2S$ and COS below predetermined concentrations during normal operation via conduit 404 as well as during transient operations via conduit 436 facilitates a transient management scheme. Specifically, maintaining a predetermined margin between $H_2S$ and COS concentrations and environmental release limits facilitates increasing flexibility of operation of IGCC plant 100 while mitigating potentials for environmental releases.

Figure 3:
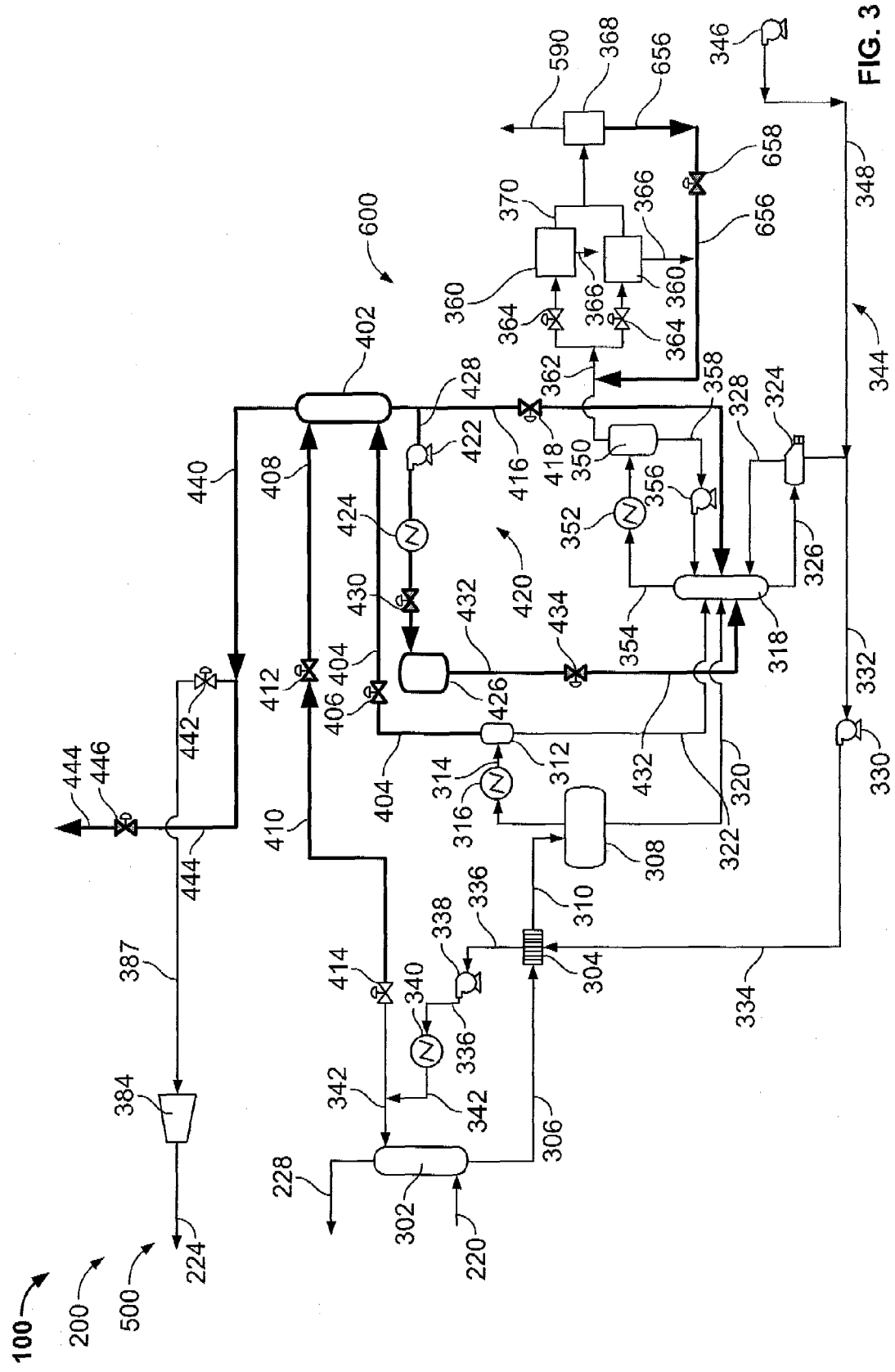
FIG. 3 is a schematic diagram of an alternative acid gas removal subsystem and sulfur removal subsystem that can be used with the IGCC power generation plant shown in FIG. 1.

FIG. 3 is a schematic diagram of an alternative acid gas removal subsystem 500 and sulfur removal subsystem 600 that can be used with IGCC power generation plant 100. Alternative acid gas removal subsystem 500 is similar to subsystem 300 with some exceptions. Subsystem 500 does not include TGU block valve 369, blower 372 and associated conduits 374 and valve 376, LP compressor 378 and associated conduits 380 and 386, and valves 382 and 388. Moreover, subsystem 500 includes a conduit 590 that couples TGU 368 with a thermal oxidizer (not shown) for removal and chemical conversion of the third integrated gas stream (not shown) channeled from TGU 368. Therefore, in alternative subsystem 500, the third integrated gas stream is not channeled to gasification system 200 as is typically done with subsystem 300.

Also, alternative sulfur removal subsystem 600 is similar to subsystem 400 with some exceptions. Subsystem 600 does not include HP compressor bypass conduit 436 and associated valve 438. Moreover, subsystem 600 includes a SRU recirculation conduit 656 that couples at least a portion of TGU 368 with SRU inlet conduit 362 in flow communication. Conduit 656 is configured to channel at least a portion of the third integrated gas stream formed by TGU 368 to SRUs 360 for additional chemical conversion. A normally open valve 658 is positioned within conduit 656.

Therefore valve 658 and conduit 656 facilitate substantially continuously recirculating at least a portion of the third integrated gas stream formed by TGU 368 to the SRUs 360 for additional chemical conversion. Such recirculation facilitates the effectiveness of SRUs 360. To further facilitate such effectiveness, the flow to SRU 360s may be decreased by closing valve 418, thereby reducing the rich solvent flow to stripper 318 which subsequently reduces the first $CO_2$/COS/$H_2S$ acid gas stream flow from stripper 318 to SRU 360s via phase separator 350. Such flow modulation to SRUs 360 facilitates operation of SRU 360s and TGU 368 such that a predetermined effectiveness of SRUs 360 and TGU 368 is substantially attained. Moreover, such method of modulating the first $CO_2$/COS/$H_2S$ acid gas stream flow from stripper 318 to SRUs 360 facilitates avoidance of emissions release.

Closing valve 418 and substantially eliminating rich solvent flow into stripper 318 from absorber 402 while maintaining the first integrated gas stream flow rate into absorber 402 via conduit 404 necessitates opening valve 430 and placing pump 422 in service, thereby facilitating continuous operation of absorber 402. The rich solvent produced in absorber 402 is channeled to storage tank 426 for channeling to stripper 318 during periods of lower stripper 318 duty. Valve 434 may be opened to facilitate channeling rich solvent to stripper 318 at a predetermined rate that facilitates operation of stripper 318.

The method and apparatus for synthetic gas, or syngas, production as described herein facilitates operation of integrated gasification combined-cycle (IGCC) power generation plants, and specifically, syngas production systems. Specifically, increasing hydrogen sulfide ($H_2S$) and carbonyl sulfide (COS) removal from syngas production fluid streams increases syngas production efficiency. More specifically, decreasing the concentration of $H_2S$ and COS in a carbon dioxide ($CO_2$) feed stream to a gasification reactor facilitates decreasing the concentration of impurities within the clean syngas channeled to a gas turbine. Moreover, configuring an integral absorber to remove $H_2S$ and COS on a substantially continuous basis as described herein facilitates optimally operating the syngas production process to facilitate improving IGCC plant production efficiency, thereby facilitating a reduction in operating costs. Furthermore, such method of continuously maintaining the absorber in service and modulating the flow of the associated gas streams facilitates avoidance of undue emissions release since the reduced concentrations of $H_2S$ and COS facilitate increased operational margins to environmental compliance limits of these compounds. Also, the method and equipment for producing such syngas as described herein facilitates reducing capital costs associated with fabricating such IGCC plant.

Exemplary embodiments of syngas production as associated with IGCC plants are described above in detail. The methods, apparatus and systems are not limited to the specific embodiments described herein nor to the specific illustrated IGCC plants. Moreover, such methods, apparatus and systems are not limited to IGCC plants and may be embedded within facilities that include, but are not limited to, hydrogen production, Fischer-Tropsch fuel production processes, as well as gasification systems and gas cleaning systems generally.

While the invention has been described in terms of various specific embodiments, those skilled in the art will recognize that the invention can be practiced with modification within the spirit and scope of the claims.

What is claimed is:

1. A method of assembling an acid gas component reduction system, said method comprising:
    coupling at least one acid removal system in flow communication with a source of a first synthetic gas (syngas) stream, wherein the first syngas stream includes at least one acid gas component having a first acid gas component concentration and carbon dioxide ($CO_2$);
    coupling a singular integral absorber in flow communication with the at least one acid removal system such that the singular integral absorber is not in direct flow communication with the first syngas stream;

configuring at least one phase separation unit within the at least one acid removal system to:

receive at least one acid removal material stream that includes $CO_2$ and at least a portion of the at least one acid gas component;

separate at least a portion of the $CO_2$ and at least a portion of the at least one acid gas component from at least a portion of the at least one acid removal material stream, thereby forming at least one $CO_2$/acid gas stream; and supply the at least one $CO_2$ acid gas stream to the singular integral absorber in a first gas stream having a first $CO_2$ concentration;

configuring the singular integral absorber to generate a second gas stream having a second $CO_2$ concentration that is greater than the first $CO_2$ concentration;

coupling a discharge conduit between the singular integral absorber, the source of the first syngas stream, and a flare conduit; and configuring the discharge conduit to selectively channel the second gas stream from the singular integral absorber to at least one of the source of the first syngas stream and the flare conduit.

2. A method in accordance with claim 1 further comprising:

configuring the singular integral absorber to produce the second syngas stream with a second acid gas component concentration that is less than the first acid gas component concentration; and coupling the second syngas stream with the source of the first syngas stream, thereby facilitating a decrease of the first acid gas component concentration.

3. A method in accordance with claim 1 wherein coupling the singular integral absorber in flow communication with the at least one acid removal system comprises configuring the singular integral absorber to receive a substantially continuous fluid stream that includes at least a portion of the at least one acid gas component.

4. A method in accordance with claim 1 wherein configuring at least one phase separation unit within the at least one acid removal system comprises:

configuring at least one first conduit within the at least one acid removal system to channel the at least one acid removal material stream to the at least one phase separation unit; and configuring at least one second conduit within the at least one acid removal system to channel the at least one $CO_2$/acid gas stream to the singular integral absorber.

5. A method in accordance with claim 4 wherein coupling the at least one acid removal system in flow communication with the first syngas stream comprises at least one of:

coupling the at least one phase separation unit in flow communication with the at least one $CO_2$/acid gas stream; and coupling at least one chemical transition unit in flow communication with the at least one $CO_2$/acid gas stream.

6. A method in accordance with claim 5 wherein coupling the singular integral absorber in flow communication with the at least one acid removal system further comprises:

coupling the at least one chemical transition unit in flow communication with the singular integral absorber; and coupling at least one acid removal material storage subsystem in flow communication with the singular integral absorber.

7. A method in accordance with claim 6 wherein coupling the singular integral absorber in flow communication with the at least one acid removal system further comprises:

configuring at least one third conduit to channel at least a portion of at least one $CO_2$/acid gas stream to the at least one chemical transition unit; and configuring at least one fourth conduit to channel at least a portion of the at least one $CO_2$/acid gas stream to the singular integral absorber.

8. A method in accordance with claim 7 wherein configuring at least one third conduit comprises one of:

configuring the at least one third conduit to form a first integrated gas stream that contains the second acid gas component concentration below a first predetermined limit, thereby forming a first acid gas-lean stream; and configuring the at least one third conduit to form a second integrated gas stream that contains the second acid gas component concentration below a second predetermined limit, thereby forming a second acid gas-lean stream.

9. A method in accordance with claim 8 wherein configuring the at least one integral absorber to receive a substantially continuous fluid stream comprises configuring the singular integral absorber to increase a margin between the first and second acid gas component concentrations that facilitates increasing a margin between the second acid gas component concentration and the first and second predetermined limits, thereby facilitating a transient management scheme.

10. A method in accordance with claim 8 wherein configuring the at least one third conduit to form a first integrated gas stream comprises configuring the at least one third conduit to channel at least a portion of the first acid gas-lean stream such that at least a portion of the first acid gas-lean stream bypasses the singular integral absorber.

11. A method in accordance with claim 8 wherein configuring the at least one third conduit to form a second integrated gas stream comprises configuring the at least one third conduit to channel at least a portion of the second acid gas-rich stream to the singular integral absorber.

12. A method in accordance with claim 6 wherein coupling the singular integral absorber in flow communication with the at least one acid removal system further comprises:

configuring the singular integral absorber to receive at least a portion of the at least one $CO_2$/acid gas stream;

configuring the singular integral absorber to remove at least a portion of $CO_2$ and at least a portion of the at least one acid gas component from the at least one $CO_2$/acid gas stream via at least a portion of an acid removal material, thereby forming at least one acid-rich material stream; and configuring the singular integral absorber to channel at least a portion of the at least one acid-rich material stream to the at least one acid removal material storage subsystem.

* * * * *